US008394296B2

(12) United States Patent
Park et al.

(10) Patent No.: US 8,394,296 B2
(45) Date of Patent: Mar. 12, 2013

(54) ELECTROCONDUCTIVE FIBER, A FIBER COMPLEX INCLUDING AN ELECTROCONDUCTIVE FIBER AND METHODS OF MANUFACTURING THE SAME

(75) Inventors: Jong-jin Park, Yongin-si (KR); Jae-hyun Hur, Yongin-si (KR); Jong-min Kim, Yongin-si (KR); Seung-nam Cha, Yongin-si (KR); Un-jeong Kim, Yongin-si (KR); Hyung-bin Son, Yongin-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 372 days.

(21) Appl. No.: 12/805,403

(22) Filed: Jul. 29, 2010

(65) Prior Publication Data

US 2011/0204297 A1 Aug. 25, 2011

(30) Foreign Application Priority Data

Feb. 19, 2010 (KR) ........................ 10-2010-0015252

(51) Int. Cl.
*H01B 1/06* (2006.01)
*B32B 9/00* (2006.01)
*D02G 3/00* (2006.01)

(52) U.S. Cl. ......................... 252/511; 428/368; 428/373

(58) Field of Classification Search .................. 252/511; 428/368, 373

See application file for complete search history.

(56) References Cited

U.S. PATENT DOCUMENTS

| | | | | |
|---|---|---|---|---|
| 6,730,401 | B2 * | 5/2004 | Jackson et al. | 428/411.1 |
| 2003/0122111 | A1 | 7/2003 | Glatkowski | |
| 2007/0265379 | A1 | 11/2007 | Chen et al. | |
| 2009/0117800 | A1 * | 5/2009 | Nakatsuka et al. | 442/199 |
| 2011/0086415 | A1 * | 4/2011 | Tustison et al. | 435/235.1 |
| 2011/0147673 | A1 * | 6/2011 | Gaillard et al. | 252/511 |
| 2012/0142832 | A1 * | 6/2012 | Varma et al. | 524/145 |

FOREIGN PATENT DOCUMENTS

| | | | |
|---|---|---|---|
| JP | 2005105510 | A | 4/2005 |
| KR | 1020070068146 | | 6/2007 |
| KR | 1020070110531 | | 11/2007 |
| KR | 1020080064739 | | 7/2008 |
| KR | 1020090012142 | | 2/2009 |
| KR | 1020090068155 | | 6/2009 |
| KR | 1020090071802 | | 7/2009 |
| KR | 1020090092982 | | 9/2009 |
| WO | WO-2004090204 | A2 | 10/2004 |

* cited by examiner

*Primary Examiner* — Mark Kopec
*Assistant Examiner* — Jaison Thomas
(74) *Attorney, Agent, or Firm* — Harness, Dickey & Pierce, P.L.C.

(57) ABSTRACT

An electroconductive fiber, a method of manufacturing an electroconductive fiber, and a fiber complex including an electroconductive fiber are provided, the electroconductive fiber includes an electroconductive polymer, an elastic polymer that forms a structure with the electroconductive polymer, and a carboneous material on at least one of the electroconductive polymer and the elastic polymer.

22 Claims, 4 Drawing Sheets

ELECTROCONDUCTIVE FIBER, A FIBER COMPLEX INCLUDING AN ELECTROCONDUCTIVE FIBER AND METHODS OF MANUFACTURING THE SAME

CROSS-REFERENCE TO RELATED APPLICATIONS

This application claims the benefit of priority under 35 U.S.C. §119 from Korean Patent Application No. 10-2010-0015252, filed on Feb. 19, 2010, in the Korean Intellectual Property Office, the disclosures of which are incorporated herein in their entirety by reference.

BACKGROUND

1. Field

Example embodiments relate to an electroconductive fiber having increased internal stress resistance, a method of manufacturing the same, and a fiber complex including the same.

2. Description of the Related Art

High-molecular polymers are generally used as electrical insulators due to their low electroconductivity. However, the demand has increased for electroconductive high-molecular polymers produced by adding an electroconductive filling material (e.g., a conductive polymer) to high-molecular polymers or textures.

For example, electroconductive high-molecular polymers may be used as electrodes of bio-information capturing sensors in order to obtain bio-information.

However, it has been found that an electroconductive texture has very low flexibility despite having excellent conductivity, and it is hard to immobilize a conductive thread and a conductive wire due to their low internal stress resistance.

SUMMARY

Provided is an electroconductive fiber having increased internal stress resistance. Provided is a method of manufacturing an electroconductive fiber having increased internal stress resistance. Provided is a fiber complex including an electroconductive fiber having increased internal stress resistance.

According to example embodiments, a fiber includes an electroconductive polymer, an elastic polymer that forms a fiber structure with the electroconductive polymer, and a carboneous material on at least one of the electroconductive polymer and the elastic polymer.

The carboneous material may be on the electroconductive polymer and the elastic polymer through a noncovalent bond.

The carboneous material may be at least one carbon nanotube. The at least one carbon nanotube may be a plurality of carbon nanotubes, wherein the plurality of carbon nanotubes are connected to each other through a noncovalent (e.g., a hydrogen bond) or covalent bond (e.g., a chemical cross-linking bond).

The fiber may be an island-in-the-sea fiber including a sea part and an island part. The sea part includes the electroconductive polymer and the elastic polymer, and the island part includes the carboneous material.

The fiber may be a double-layered structure having a core formed of the carboneous material and a shell formed of the electroconductive polymer and the elastic polymer.

The fiber may include a plurality of metal nanoparticles. The metal nanoparticles may be connected to the carboneous material through a dihydrogen bond. The metal nanoparticles may be on a surface of the fiber or in the fiber. The metal nanoparticles may be in a complex including the electroconductive polymer and the elastic polymer.

If the fiber is an island-in-the-sea fiber including a sea part and an island part, the sea part includes the electroconductive polymer and the elastic polymer, and the island part includes the carboneous material and the metal nanoparticles.

The fiber may be a double-layered structure having a core formed of the carboneous material and the metal nanoparticles, and a shell formed of the electroconductive polymer and the elastic polymer.

The carboneous material may be at least one carbon nanotube selected from the group consisting of a surface-modified carbon nanotube and a non-surface-modified carbon nanotube. The surface-modified carbon nanotube is selected from the group consisting of a carbon nanotube surface-modified with 3,4-dihydroxy-L-phenylalanine (DOPA) (CNT-DOPA), a carbon nanotube surface-modified with acryl (CNT-Acryl) and a carbon nanotube surface-modified with epoxy (CNT-Epoxy).

The carboneous material may be at least one selected from the group consisting of carbon nanotubes, graphene, pentacene, tetracene, antracene, rubrene, parylene, coronene and mixtures thereof.

According to other example embodiments, a fiber complex includes the above-described fiber.

In yet other example embodiments, a method of manufacturing a fiber includes preparing a composition including an electroconductive polymer, an elastic polymer, a carboneous material and an ionic liquid, and spinning the composition so as to manufacture the fiber.

BRIEF DESCRIPTION OF THE DRAWINGS

These and/or other example embodiments will become apparent and more readily appreciated from the following description of the embodiments, taken in conjunction with the accompanying drawings of which.

DETAILED DESCRIPTION

Figure 1:
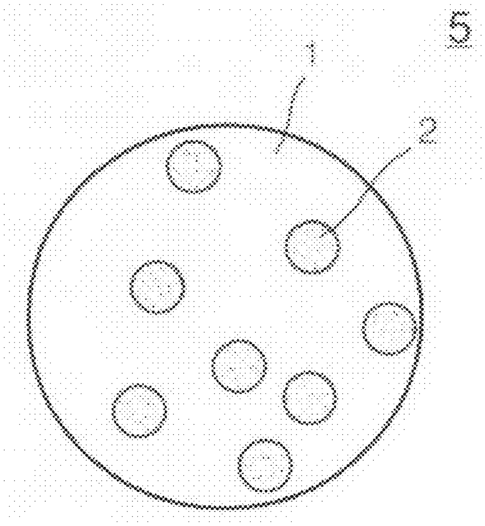
FIG. 1 illustrates an island-in-the-sea fiber in which a sea part including an electroconductive polymer and an elastic polymer and an island part including a carbon nanotube are disposed according to example embodiments.

Various example embodiments will now be described more fully with reference to the accompanying drawings in which some example embodiments are shown. However, specific structural and functional details disclosed herein are merely representative for purposes of describing example embodiments. Thus, the invention may be embodied in many alternate forms and should not be construed as limited to only example embodiments set forth herein. Therefore, it should be understood that there is no intent to limit example embodiments to the particular forms disclosed, but on the contrary, example embodiments are to cover all modifications, equivalents, and alternatives falling within the scope of the invention.

In the drawings, the thicknesses of layers and regions may be exaggerated for clarity, and like numbers refer to like elements throughout the description of the figures.

Although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that, if an element is referred to as being "connected" or "coupled" to another element, it can be directly connected, or coupled, to the other element or intervening elements may be present. In contrast, if an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," if used herein, specify the presence of stated features, integers, steps, operations, elements and/or components, but do not preclude the presence or addition of one or more other features, integers, steps, operations, elements, components and/or groups thereof.

Spatially relative terms (e.g., "beneath," "below," "lower," "above," "upper" and the like) may be used herein for ease of description to describe one element or a relationship between a feature and another element or feature as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, for example, the term "below" can encompass both an orientation that is above, as well as, below. The device may be otherwise oriented (rotated 90 degrees or viewed or referenced at other orientations) and the spatially relative descriptors used herein should be interpreted accordingly.

Example embodiments are described herein with reference to cross-sectional illustrations that are schematic illustrations of idealized embodiments (and intermediate structures). As such, variations from the shapes of the illustrations as a result, for example, of manufacturing techniques and/or tolerances, may be expected. Thus, example embodiments should not be construed as limited to the particular shapes of regions illustrated herein but may include deviations in shapes that result, for example, from manufacturing. For example, an implanted region illustrated as a rectangle may have rounded or curved features and/or a gradient (e.g., of implant concentration) at its edges rather than an abrupt change from an implanted region to a non-implanted region. Likewise, a buried region formed by implantation may result in some implantation in the region between the buried region and the surface through which the implantation may take place. Thus, the regions illustrated in the figures are schematic in nature and their shapes do not necessarily illustrate the actual shape of a region of a device and do not limit the scope.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In order to more specifically describe example embodiments, various aspects will be described in detail with reference to the attached drawings. However, the present invention is not limited to example embodiments described.

Example embodiments provide an electroconductive fiber having increased internal stress resistance.

Other example embodiments provide a method of manufacturing an electroconductive fiber having increased internal stress resistance.

Yet other example embodiments provide a fiber complex including an electroconductive fiber having increased internal stress resistance.

In example embodiments, there is provided a fiber including an electroconductive polymer, an elastic polymer, and a carboneous material (i.e., carbon nanotubes, graphene, pentacene, tetracene, antracene, rubrene, parylene, coronene or mixtures thereof) wherein the carboneous material is immobilized on at least one of the electroconductive polymer and the elastic polymer.

Hereon, example embodiments are described with the use of a carbon nanotube as the carboneous material. However, example embodiments are not limited thereto. That is, the carboneous material may be a carbon nanotube, graphene, pentacene, tetracene, antracene, rubrene, parylene, coronene or mixtures thereof.

The "electroconductive polymer" includes a plurality of molecules capable of forming a fiber structure that allows an electrical current to flow through the fiber structure. The electroconductive polymer has conductivity and may be used to manufacture a fiber. The electroconductive polymer may be semi-conductive. For example, the electroconductive polymer may be used to manufacture a fiber when spun in a general spinning process (e.g., electrospinning, wet spinning, conjugate spinning, melt blown spinning and flash spinning) after being dissolved into a solvent.

The electroconductive polymer is a support for forming a fiber structure. The electroconductive polymer may have an affinity to the elastic polymer and thus form a fiber structure with the elastic polymer. The electroconductive polymer may form a noncovalent bond with at least one of a carbon nanotube or a metal nanoparticle.

The electroconductive polymer may be selected from the group consisting of polyacetylene, polypyrrole, polythiopene, polyethylenedioxythiopene, polyphenylenevinylene, polyphenylene, polysilane, polyfluorene, polyaniline, polysulfur nitride and mixtures thereof.

The "elastic polymer" is a polymer with elasticity and may form a fiber structure. The elastic polymer may be used to manufacture a fiber. For example, the elastic polymer may be used to manufacture a fiber when spun in a general spinning process (e.g., electrospinning, wet spinning, conjugate spinning, melt blown spinning and flash spinning) after being dissolved into a solvent.

The elastic polymer is a support for forming a fiber structure. The elastic polymer may have an affinity towards the electroconductive polymer, and thus form a structure with the electroconductive polymer. The elastic polymer may form a noncovalent bond with at least one of a carbon nanotube or a metal nanoparticle.

The elastic polymer may be selected from the group consisting of natural rubber, synthetic rubber and elastomer.

The elastic polymer may be selected from the group consisting of natural rubber, form rubber, acrylonitrile butadiene rubber, fluorine rubber, silicone rubber, ethylene propylene rubber, urethane rubber, chloroprene rubber, styrene butadiene rubber, chlorosulfonated polyethylene rubber, polysulfide rubber, acrylate rubber, epichlorohydrin rubber, acrylonitrile ethylene rubber, urethane rubber, polystyrene elastomer, polyolefin elastomer, polyvinyl chloride elastomer, polyurethane elastomer, polyester elastomer, polyamide elastomer and mixtures thereof.

The carbon nanotube is a material that may form a noncovalent bond with at least one of the electroconductive polymer and the elastic polymer. The carbon nanotube may be immobilized by a noncovalent bond with at least one of the electroconductive polymer and the elastic polymer, which may collectively form the fiber structure.

The carbon nanotubes may be connected to each other within a fiber through noncovalent or covalent bonds. The noncovalent bond may include, but is not limited to, an ionic bond, a hydrogen bond or a van der Waals bond. The covalent bond may include a chemical cross-linking bond.

The carbon nanotubes may include single-walled carbon nanotubes or multi-walled carbon nanotubes or combinations thereof. The carbon nanotubes may include surface-modified carbon nanotubes, non-surface-modified carbon nanotubes or mixtures thereof. For example, the carbon nanotube may be a mixture of a surface-modified carbon nanotube and a non-surface-modified carbon nanotube.

The surface-modified carbon nanotubes may include a carbon nanotube surface-modified with a material having good miscibility. For example, the surface-modified carbon nanotubes may include a carbon nanotube surface-modified with a material having good miscibility and selected from the group consisting of urea, melamine, phenol, unsaturated polyester, epoxy, resorcinol, vinyl acetate, polyvinyl alcohol, vinyl chloride, polyvinyl acetal, acryl, saturated polyester, polyamide, polyethylene, butadiene rubber, nitrile rubber, butyl rubber, silicone rubber, chloroprene rubber, vinyl, phenol-chloroprene rubber, polyamide, nitrile rubber-epoxy and mixtures thereof.

The surface-modified carbon nanotubes may be selected from the group consisting of, for example, a carbon nanotube surface-modified with 3,4-dihydroxy-L-phenylalanine (DOPA) (referred to as "CNT-DOPA"), a carbon nanotube surface-modified with acryl (referred to as "CNT-Acryl") and a carbon nanotube surface-modified with epoxy (referred to as "CNT-Epoxy").

The carbon nanotube surface-modified with acryl may include a carbon nanotube surface-modified with a compound represented by Formula 1 below.

Formula 1

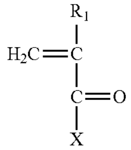

where $R_1$ may be hydrogen (H) or a $C_1$-$C_4$ alkyl, and X may include a halide, amine ($NH_2$) or hydroxide (OH).

The carbon nanotube surface-modified with epoxy may include a carbon nanotube surface-modified with a compound represented by Formula 2 below.

Formula 2

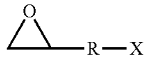

where R may be a linear or branched $C_1$-$C_4$ alkyl, and X may be a halide.

The fiber may be, but is not limited to, a simple fiber or a core-shell type fiber. The simple fiber has a structure in which a carbon nanotube is disposed in a complex including an electroconductive polymer and an elastic polymer, which collectively form a fiber structure. The simple fiber is manufactured by spinning a fiber composition through a nozzle. That is, the simple fiber may have an island-in-the-sea structure in which the electroconductive polymer and the elastic polymer form a sea part, and the carbon nanotube forms an island part.

FIG. 1 illustrates an island-in-the-sea fiber according to example embodiments.

Referring to FIG. 1, an island-in-the sea fiber 5 includes a sea part 1 including an electroconductive polymer and elastic polymer, and an island part 2 including a carbon nanotube.

A core-shell type fiber has a double-layered structure having a core and a shell, in which a carbon nanotube forms the core and the electroconductive polymer and the elastic polymer form the shell. The core-shell type fiber is a fiber manufactured by spinning a fiber composition through a dual nozzle provided with an inner nozzle and an outer nozzle.

Figure 2:
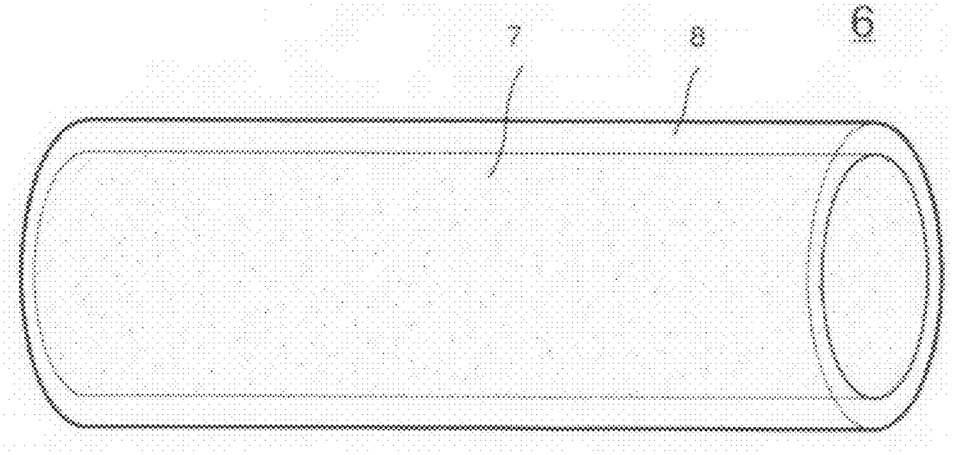
FIG. 2 is a side view illustrating a double-layer fiber in which a core includes a carbon nanotube and a shell includes an electroconductive polymer and an elastic polymer according to example embodiments.

FIG. 2 is a side view illustrating a double-layer fiber according to example embodiments.

Referring to FIG. 2, a double-layer fiber 6 includes a core 7 that includes the carbon nanotube, and a shell 8 that includes the electroconductive polymer and the elastic polymer.

The carbon nanotubes in the fiber may be connected to each other through a noncovalent or covalent bond. For example, the carbon nanotubes may be connected to each other through a hydrogen bond or a chemical cross-linking bond. A surface-modified carbon nanotube in the fiber (e.g., a carbon nanotube surface-modified with DOPA) may be connected through a hydrogen bond to another neighboring carbon nanotube by a terminal group (e.g., a hydroxyl group or an amine group).

A carbon nanotube surface-modified in the fiber (e.g., carbon nanotubes surface-modified with acryl or a carbon nanotubes surface-modified with epoxy) may be connected to each other through a chemical cross-linking bond using a curing process (e.g., a thermal treatment or an ultraviolet (UV) treatment).

The fiber may further include a plurality of metal nanoparticles. The metal nanoparticles may be metal nanoparticles having electroconductivity. The metal nanoparticles may be disposed on a surface of the fiber or in the fiber. For example, the metal nanoparticles may be disposed in the fiber.

The metal nanoparticles in (or on) the fiber may be connected through a dihydrogen bond to a surface-modified carbon nanotube or a non-surface-modified carbon nanotube.

Figure 3:
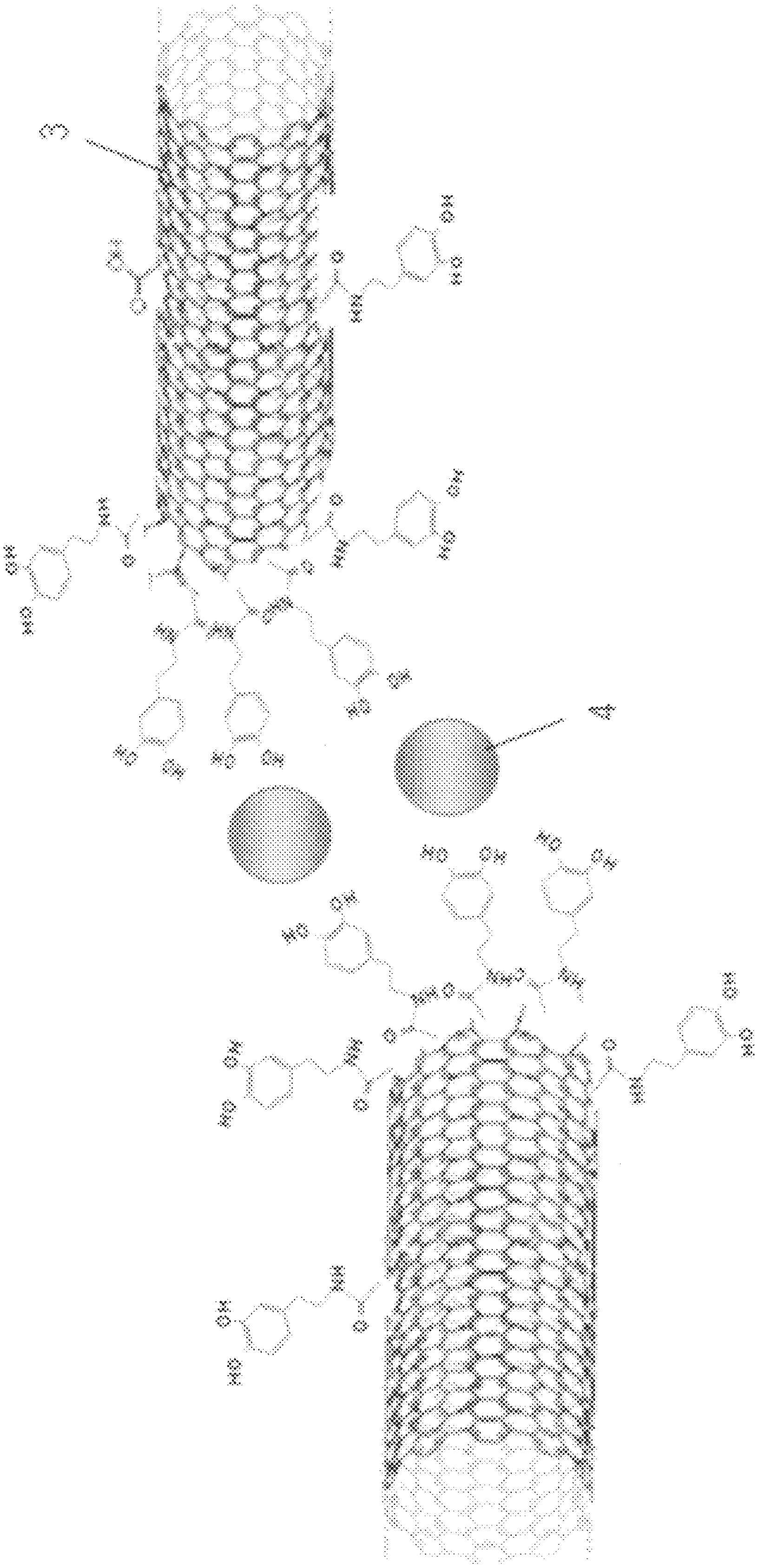
FIG. 3 illustrates a dihydrogen bond between a metal nanoparticle and a carbon nanotube surface-modified with 3,4-dihydroxy-L-phenylalanine (DOPA) according to example embodiments.

FIG. 3 illustrates a dihydrogen bond between metal nanoparticle and a carbon nanotube surface-modified with DOPA according to example embodiments.

Referring to FIG. 3, a dihydrogen bond between a carbon nanotube 3 surface-modified with DOPA and a metal nanoparticle 4 is formed due to hydroxyl groups of the DOPA.

The fiber, although not limited, may be a simple fiber or a core-shell type fiber. The simple fiber has a structure in which carbon nanotubes and metal nanoparticles are disposed in a complex including the electroconductive polymer and the elastic polymer, which collectively form a fiber. The simple fiber is manufactured by spinning a fiber composition through a nozzle. That is, the simple fiber may have an island-in-the-sea structure including a sea part provided with the electroconductive polymer and the elastic polymer, and an island part including the carbon nanotubes and the metal nanoparticles. The fiber has a double layer of core-shell-structure in which the carbon nanotubes and the metal nanoparticles form a core and the electroconductive polymer and the elastic polymer form a shell.

The metal nanoparticles may be selected from the group consisting of silver, copper, nickel, gold, tin, zinc, platinum, tungsten, molybdenum, magnesium oxide, beryllium oxide, chromium oxide, titanium oxide, zinc oxide, barium titanate, diamond, graphite, carbon nanoparticle, silicon nanoparticle, boron nitride, aluminum nitride, boron carbide, titanium carbide, silicon carbide, tungsten carbide and mixtures thereof.

The metal nanoparticles may have a size ranging from about 100 nm to about 300 nm.

The fiber may be a macro-, micro- or nanoscale fiber in diameter. The macroscale fiber may be about 600 μm to about 1000 μm in diameter, the microscale fiber may be about 1 μm to about 300 μm in diameter and the nanoscale fiber may be about 1 nm to about 500 nm in diameter.

In other example embodiments, provided is a method of manufacturing a fiber including preparing a composition including an electroconductive polymer, an elastic polymer, at least one carbon nanotube and an ionic liquid, and manufacturing (or forming) a fiber by spinning the composition.

A composition including an electroconductive polymer, an elastic polymer, at least one carbon nanotube and an ionic liquid is prepared.

Descriptions of the electroconductive polymer, the elastic polymer and the carbon nanotube are the same as presented above. The electroconductive polymer may be selected from the group consisting of polyacetylene, polypyrrole, polythiopene, polyethylenedioxythiopene, polyphenylenevinylene, polyphenylene, polysilane, polyfluorene, polyaniline, polysulfur nitride and mixtures thereof.

The elastic polymer may be selected from the group consisting of natural rubber, synthetic rubber and elastomer.

The elastic polymer may be selected from the group consisting of natural rubber, form rubber, acrylonitrile butadiene rubber, fluorine rubber, silicone rubber, ethylene propylene rubber, urethane rubber, chloroprene rubber, styrene butadiene rubber, chlorosulfonated polyethylene rubber, polysulfide rubber, acrylate rubber, epichlorohydrin rubber, acrylonitrile ethylene rubber, urethane rubber, polystyrene elastomer, polyolefin elastomer, polyvinyl chloride elastomer, polyurethane elastomer, polyester elastomer polyamide elastomer and mixtures thereof.

The carbon nanotubes may include surface-modified carbon nanotubes, non-surface-modified carbon nanotubes or mixtures thereof. The surface-modified carbon nanotubes may be selected from the group consisting of a carbon nanotube surface-modified with 3,4-dihydroxy-L-phenylalanine (DOPA) (referred to as "CNT-DOPA"), a carbon nanotube surface-modified with acryl (referred to as "CNT-Acryl") and a carbon nanotube surface-modified with epoxy (referred to as "CNT-Epoxy").

The ionic liquid may include a cationic liquid, an anionic liquid or an ion-pair liquid.

The ionic liquid may include a cation and an anion. The cation may be, for example, dialkylimidazolium, alkylpyridinium, quaternary ammonium or quaternary phosphonium. The anion may be, for example, chloride ion ($Cl^-$), nitrate ion ($NO_3^-$), tetrafluoroborate ion ($BF_4^-$), hexafluorophosphate ion ($PF_6^-$), tetrachloroaluminum ion ($AlCl_4^-$), heptachlorodialuminate ion ($Al_2Cl_7^-$), acetate ion ($AcO^-$), trifluoromethanesulfonate ion ($TfO^-$), bis(trifluoromethanesulfonyl)imide ion ($Tf_2N^-$), bis(trifluoromethylsulfonyl)imide ion ($(CF_3SO_2)_2N^-$) or lactate ion ($CH_3CH(OH)CO_2^-$). For example, the ionic liquid may include lithium chloride (LiCl), 1-ethyl-3-methylimidazolium tetrafluoroborate ([emim][$BF_4$]), 1-butyl-3-methylimidazolium tetrafluoroborate ([bmim][$BF_4$]), 1-hexyl-3-methyl-imidazolium tetrafluoroborate ([hmim][$BF_4$]), 1-ethyl-3-methylimidazolium trifluoromethylsulfonate ([emim][$CF_3SO_3$]), 1-butyl-3-methylimidazolium trifluoromethylsulfonate ([bmim][$CF_3SO_3$]), 1-hexyl-3-methyl-imidazolium trifluoromethylsulfonate ([hmim][$CF_3SO_3$]), 1-ethyl-3-methylimidazolium hexafluorophosphate ([emim][$PF_6$]), 1-butyl-3-methylimidazolium hexafluorophosphate ([bmim][$PF_6$]), 1-hexyl-3-methyl-imidazolium hexafluorophosphate ([hmim][$PF_6$]), [emim][$CF_3SO_2$], 1-ethyl-3-methylimidazolium bis(trifluoromethanesulphonyl)amide ([emim][($CF_3SO_2$)2N]), 1-ethyl-3-methylimidazolium polyfluoride ([emim][F(HF)n]) or butylpyridinium hexafluorophosphate ([bp][$PF_6$]).

The composition may be prepared in a solvent that may allow the electroconductive polymer, the elastic polymer and the carbon nanotube to be dissolved therein, and may be mixed with an ionic liquid. The solvent may have a dielectric constant of about 0.5 or more. The solvent may include, but is not limited to, dimethylformamide, methyl ethyl ketone, chloroform, dichloromethane, methylpyridinone, dimethylsulfoxide, methanol, ethanol, propanol, butanol, t-butyl alcohol, isopropyl alcohol, benzyl alcohol, tetrahydrofuran, ethyl acetate, butyl acetate, propylene glycol diacetate, propylene glycol methyl ether acetate, formic acid, acetic acid, trifluoroacetate, acetonitrile, trifluoroacetonitrile, ethylene glycol, dimethylacetamide (DMAC), DMAC-LiCl, N,N'-1,3-dimethylpropyleneurea, morpholine, pyridine, pyrrolidine and mixtures thereof. Although not limited to, the temperature of the composition may be maintained at room temperature range so as to form and spin a droplet through a nozzle.

The composition may include a plurality of metal nanoparticles. Descriptions about the metal nanoparticles are the same as presented above.

The metal nanoparticles may be selected from the group consisting of silver, copper, nickel, gold, tin, zinc, platinum, tungsten, molybdenum, magnesium oxide, beryllium oxide, chromium oxide, titanium oxide, zinc oxide, barium titanate, diamond, graphite, carbon nanoparticle, silicon nanoparticle, boron nitride, aluminum nitride, boron carbide, titanium carbide, silicon carbide, tungsten carbide and mixtures thereof.

The electroconductive polymer may be included in the composition at a concentration of about 0.05% by weight to about 40% by weight.

A concentration of the elastic polymer in the composition may be about 0.05% by weight to about 50% by weight.

A concentration of the carbon nanotubes in the composition may be about 0.05% by weight to about 10% by weight.

A concentration of the ionic liquid in the composition may be about 0.05% by weight to about 10% by weight.

A concentration of the metal nanoparticles in the composition may be about 0.05% by weight to about 5% by weight.

The composition is spun to manufacture a fiber. In detail, the fiber may be prepared by spinning the composition using a spinning method selected from the group consisting of electrospinning, wet spinning, conjugate spinning, melt blown spinning and flash spinning.

Figure 4:
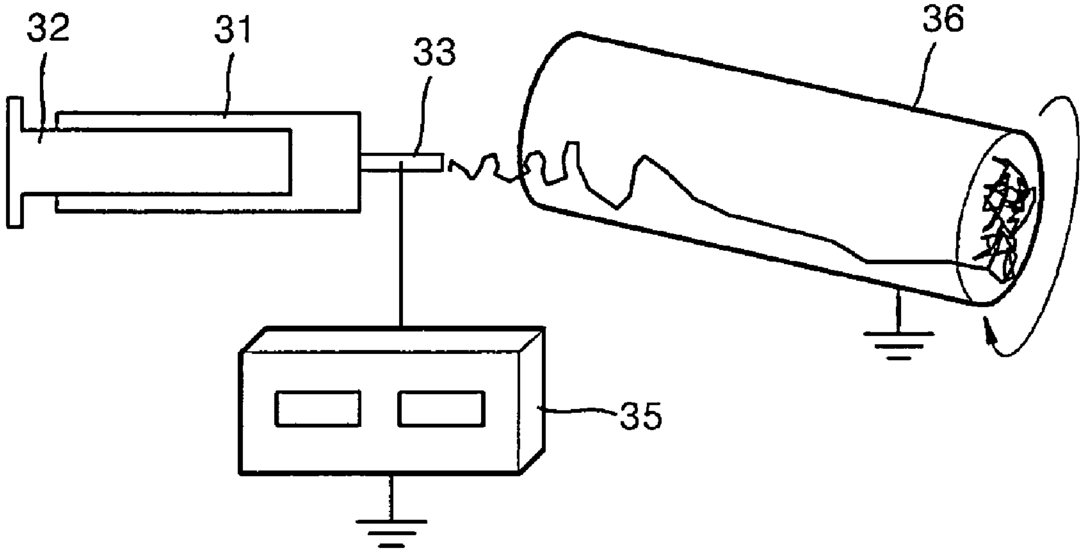
FIG. 4 is a schematic diagram illustrating an electrospinning apparatus used for manufacturing a fiber according to example embodiments.

FIG. 4 is a schematic diagram illustrating an electrospinning apparatus used to manufacture a fiber by electrospinning according to example embodiments.

Referring to FIG. 4, in the case of electrospinning, a composition, which is included in a syringe 31, is pushed out of a nozzle 33 using a syringe pump 32 at a constant speed. When droplets of a mixture solution (from the ejected composition) are formed outside the nozzle, the mixture is electrospun to a collector 36 by applying a high voltage of about 10 kV to about 20 kV to the nozzle by the electric power supply 35. A pumping speed of the syringe, a diameter of the nozzle, the voltage size applied to the nozzle, a spinning speed and a distance between the nozzle and the collector may be changed according to physical properties (e.g., a diameter range) of the fiber.

Optionally, a fiber with a structure of core-shell double-layer may be manufactured using a dual nozzle for a nozzle of the electrospinning apparatus. That is, a carbon nanotube, or a composition of the carbon nanotube and a metal nanoparticle, is spun using an inner nozzle and a composition including an electroconductive polymer and an elastic polymer is spun using an outer nozzle. The core-shell double-layer fiber may include a core portion with the carbon nanotube or a complex of the carbon nanotube and the metal nanoparticle, and a shell portion with the complex including the electroconductive polymer and the elastic polymer.

Optionally, a core-shell type fiber having a double-layered structure may be manufactured using a dual nozzle in the electrospinning apparatus. That is, a carbon nanotube or a composition containing the carbon nanotube and a metal nanoparticle is spun using an inner nozzle, and a composition including an electroconductive polymer and an elastic polymer is spun using an outer nozzle. The core-shell type fiber with the double-layered structure may include a core portion including the carbon nanotube or a complex containing the carbon nanotube and the metal nanoparticle, and a shell portion including the complex containing the electroconductive polymer and the elastic polymer.

Optionally, a tri-layer-structure fiber of core-first shell-second shell may be manufactured using a triple nozzle in the electrospinning apparatus. That is, a carbon nanotube or a composition of the carbon nanotube and a metal nanoparticle are spun using a first nozzle, an electroconductive polymer is spun using a second nozzle, and an elastic polymer is spun using a third nozzle.

Optionally, a fiber arrayed in a set direction may be manufactured by spinning the composition on an electrode to which an electric field is applied.

The method may further include performing a curing process on the fiber that was manufactured by spinning. The curing process may be performed when a surface-modified carbon nanotube (e.g., a carbon nanotube surface-modified with acryl or a carbon nanotube surface-modified with epoxy) is used. The curing process may include, for example, a thermal treatment or a ultra-violet (UV) treatment.

According to other example embodiments, there is provided is a fiber complex including the fiber.

Descriptions about the fiber are the same as presented above.

The fiber complex may include a medical apparatus, an electrode, a thin film transistor (TFT), a display, a device or a sensor which include the fiber.

Hereinafter, example embodiments will be described in detail with reference to one or more embodiments. However, these embodiments will be described as illustrative only for understanding of the example embodiments, and the scope of is the example embodiments is not limited thereto.

Manufacturing Example

Manufacturing of a Surface-Modified Carbon Nanotube (1) Purification of a Carbon Nanotube 1,000-mg of a carbon nanotube (ILJIN CNT AP-Grade, ILJIN Nanotech Co. Ltd., South Korea) is refluxed at 100° C. for 12 hours by using 50-mL of distilled water in a 500-mL flask equipped with a reflux tube. After the reflux is completed, a filtrate is dried at 60° C. for 12 hours, and then residual fullerenes are washed with toluene. After remaining soot materials are collected to the flask and heated in a 470° C. heater for 20 minutes, the soot materials are washed with 6M hydrochloric acid to remove all metal components and thereby obtain a pure carbon nanotube.

(2) Substitution by Carboxyl Group on a Surface of the Carbon Nanotube

The pure carbon nanotube obtained above is refluxed in a sonicator with a mixed acid solution of nitric acid:sulfuric acid=7:3 (v/v) for 24 hours. After the solution is filtrated through a 0.2-μm polycarbonate filter, a filtrate is further refluxed in nitric acid at 90° C. for 45 hours. Next, after a supernatant is obtained by centrifugation at 12,000 rpm and is filtrated through a 0.1-μm polycarbonate filter, the filtrate is dried at 60° C. for 12 hours. After a dried carbon nanotube is dispersed in dimethylformamide (DMF), the carbon nanotube is selectively used by filtration through a 0.1-μm polycarbonate filter.

(3) Manufacturing of a Carbon Nanotube Surface-Modified with DOPA

After 0.03 g of the pure carbon nanotube obtained above is added to 20-mL of acetone, particles are dispersed by a supersonic treatment for one hour. 10-mL of dopamine and 10-mL of 1-(3-dimethylaminopropyl)-3-ethylcarbodiimide hydrochloride (EDC) are added to an obtained solution, and the solution is stirred for 4 hours.

(4) Manufacturing of a Carbon Nanotube Surface-Modified with Acryl

After 0.03 g of the pure carbon nanotube obtained above is added to 20-mL of DMF and particles are dispersed by a supersonic treatment for one hour, 10-mL of triethylamine (TEA) dissolved in 20-mL of DMF is added to a carbon nanotube dispersion and stirred for one hour. To remove heat generated during the reaction, the mixture is transferred to an ice bath, and then 5-mL of acryloyl chloride dissolved in 100-mL of DMF is added dropwise while the mixture is being slowly stirred for 2 hours. Next, the mixture is allowed to react at room temperature for 24 hours. After the completion of the reaction, 300-mL of distilled water is added to the reacted mixture, and a generated precipitate is filtrated through a 0.2-μm polycarbonate filter. After the filtrated precipitate is washed three times by using water and diethylether to wash unreacted acryloyl chloride, the reacted mixture is dried under reduced pressure at room temperature (about 25° C.) to obtain 0.02 g of a carbon nanotube that is surface-substituted with an acryl group. The presence of a substituted acryl group on a surface of the carbon nanotube is identified by Raman spectrum.

(5) Manufacturing of a Carbon Nanotube Surface-Modified with Epoxy

After 0.03 g of the pure carbon nanotube obtained above is added to 20-mL of DMF and particles are dispersed by a supersonic treatment for one hour, 10-mL of triethylamine (TEA) dissolved in 20-mL of DMF is added to the carbon nanotube dispersion and stirred for one hour. To remove heat generated during the reaction, the mixture is transferred to an ice bath, and then 5-mL of epichlorohydrin dissolved in 100-mL of DMF is added dropwise while the mixture is being slowly stirred for 2 hours. Next, the mixture is allowed to react at room temperature (about 25° C.) for 24 hours. After the completion of the reaction, 300-mL of distilled water is added to the reacted mixture, and a generated precipitate is filtrated through a 0.2-μm polycarbonate filter. After the filtrated precipitate is washed three times by using water and diethylether to wash unreacted epichlorohydrin, the reacted mixture is dried under reduced pressure at room temperature (about 25° C.) to obtain 0.02 g of carbon nanotube that is surface-substituted with an epoxy group. The presence of a substituted epoxy group on a surface of the carbon nanotube is identified by Raman spectrum.

Example 1

Manufacturing of a Fiber

Components are mixed according to composition described in Table 1 below and are homogeneously mixed by sonication to obtain a composition for radiation. The composition is added to a syringe and is pushed out of a nozzle by using a syringe pump at a constant rate (0.4 mL/h). When droplets of the composition for radiation are formed outside the nozzle, a fiber of dozens to hundreds of nm in diameter is electrospun on a collector by applying a voltage of 15 Kv by the electric power supply to manufacture a fiber.

TABLE 1

| | Specimen No. | | | | | |
|---|---|---|---|---|---|---|
| | 1 | 2 | 3 | 4 | 5 | 6 |
| Poly (30hexylthiopene) (P3HT) (g) | 1 | 1 | 1 | 1 | 1 | 1 |
| Styrene-butadiene-styrene (SBS) (g) | 1 | 1 | 1 | 1 | 1 | 1 |
| Carbon nanotube (CNT) (g) | 0.2 | 0.2 | 0.2 | 0.2 | 0.2 | 0.2 |
| CNT-DOPA (g) | 0.1 | 0.12 | 0.14 | 0.16 | 0.2 | 0.25 |
| 1,3-dimethylimidazolium tetrafluoroborate (g) | 0.1 | 0.1 | 0.1 | 0.1 | 0.1 | 0.1 |
| DMF (g) | 3 | 3 | 3.1 | 3.2 | 3.5 | 3.8 |

Example 2

Manufacturing of a Fiber

Components are mixed according to the composition described in Table 2 below and homogeneously mixed by sonication to obtain a composition for radiation. The composition is added to a syringe and is pushed out of a nozzle by using a syringe pump at a constant speed (0.3 mL/h). When droplets of the composition for radiation are formed outside the nozzle, a fiber of dozens to hundreds of nm in diameter is electrospun on a collector by applying a voltage of 15 Kv by means of the electric power supply to manufacture a fiber.

TABLE 2

| | Specimen No. | | | | | |
|---|---|---|---|---|---|---|
| | 7 | 8 | 9 | 10 | 11 | 12 |
| Poly (30hexylthiopene) (P3HT) (g) | 1 | 1 | 1 | 1 | 1 | 1 |
| SBS (g) | 1 | 1 | 1 | 1 | 1 | 1 |
| CNT (g) | 0.2 | 0.2 | 0.2 | 0.2 | 0.2 | 0.2 |
| CNT-DOPA (g) | 0.1 | 0.12 | 0.14 | 0.16 | 0.2 | 0.25 |
| 1,3-dimethylimidazolium tetrafluoroborate (g) | 0.1 | 0.1 | 0.1 | 0.1 | 0.1 | 0.1 |
| gold nanoparticle (g) | 0.1 | 0.1 | 0.1 | 0.1 | 0.1 | 0.1 |
| DMF (g) | 3 | 3 | 3.1 | 3.2 | 3.5 | 3.8 |

Example 3

Manufacturing of a Fiber

Components are mixed according to the composition described in Table 3 below and homogeneously mixed by sonication to obtain a composition for radiation. The composition is added to a syringe and is pushed out of a nozzle by using a syringe pump at a constant rate (0.4 mL/h). When droplets of the composition for radiation are formed outside the nozzle, a fiber of dozens to hundreds of nm in diameter is electrospun on a collector by applying a voltage of 15 Kv by the electric power supply to manufacture a fiber.

TABLE 3

| | Specimen No. | | | |
|---|---|---|---|---|
| | 13 | 14 | 15 | 16 |
| Poly(30hexylthiopene) (P3HT) (g) | 1 | 1 | 1 | 1 |
| SBS (g) | 1 | 1 | 1 | 1 |
| CNT (g) | 0.2 | 0.2 | 0.2 | 0.2 |
| CNT-DOPA (g) | 0.1 | 0.12 | 0.14 | 0.16 |
| 1,3-dimethylimidazolium tetrafluoroborate (g) | 0.1 | 0.1 | 0.1 | 0.1 |
| silver nanoparticle (g) | 0.1 | 0.1 | 0.1 | 0.1 |
| DMF (g) | 3 | 3 | 3.1 | 3.2 |

Figure 5:
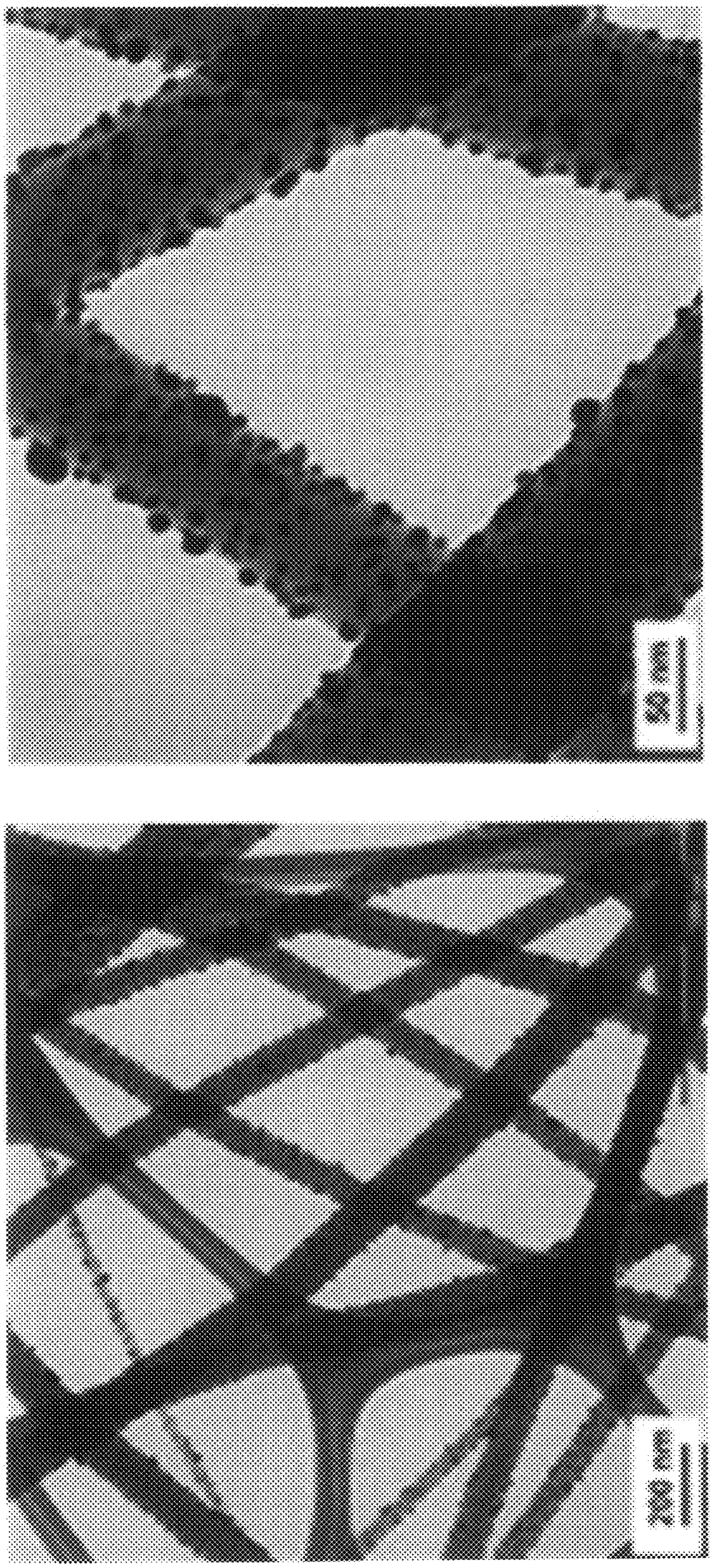
FIG. 5 is an electron micrograph illustrating a fiber manufactured according to example embodiments.

FIG. 5 is a magnified view of a fiber manufactured according to example embodiments as seen under an electronic microscope.

Comparative Example

Manufacturing of a Fiber Excluding CNT, CNT-DOPA and Gold Nanoparticle

A fiber is manufactured using the same method as Examples 1 and 2 above, except for CNT, CNT-DOPA and gold nanoparticle or silver nanoparticle.

Experimental Example 1

Assessment of Electroconductivity and Internal Stress Resistance of a Manufactured Fiber (1) Measuring Electroconductivity of a Fiber Electroconductivity is measured by using a four line probe method at room temperature (about 25° C.) at a 50-% relative humidity. A carbon paste is used so as to prevent corrosion during contact with a gold line electrode. Generally, from a film-type specimen having a thickness of 1 μm to 100 μm (thickness t, width w), conductivity on a current (i), a voltage (V), and a distance (l) between two outer electrodes and two inner electrodes is measured by a Keithley conductivity measurement apparatus.

Conductivity is calculated using the formula below, and the conductivity unit is Siemem/cm or S/cm. Conductivity is measured by using a standard four point probe in the Van der Pauw method to identify the conductivity homogeneity of a specimen.

$$\text{Conductivity}=(l\cdot i)/(w\cdot t\cdot v)$$

Measurement results for specimens 7 to 12 above are shown in Table 4.

(2) Measuring Internal Stress Resistance of a Fiber

Rotor type (Oscillating Disc Rheometer, ASTM D 2084-95) or Rotorless type (Curastometer ASTM D5289) meters may be used for measuring the internal stress resistance (dynamic elasticity rate) of a fiber. In the Experimental Example 1, the internal stress resistance is measured by determining the ratio of the maximum length of an undisconnected fiber when extended by a force of 1 $kg/m^2$ to the initial length.

Results of measuring the conductivity and internal stress resistance for specimens 7 to 12 and Comparative Example 1 above are shown in Table 4.

TABLE 4

| | Specimen No. | | | | | | Comparative |
|---|---|---|---|---|---|---|---|
| | 7 | 8 | 9 | 10 | 11 | 12 | Example |
| Electro-conductivity (S/cm) | 65 | 53 | 51 | 49 | 12 | 6 | 1 |
| Internal expansion stress (%) | ~130 | ~170 | ~180 | ~190 | 250 | 310 | 20 |

As apparent from Table 4 above, the electroconductivity and internal stress resistance of a fiber manufactured according to example embodiments is increased compared to a fiber excluding CNT, CNT-DOPA and gold nanoparticle.

Experimental Example 2

Assessment of Electroconductivity and Internal Stress Resistance of a Manufactured Fiber Conductivity and internal stress resistance for specimens 13 to 16 are measured using the same method as in Experimental Example 1 above. The results are shown in Table 5.

TABLE 5

| | Specimen No. | | | |
|---|---|---|---|---|
| | 13 | 14 | 15 | 16 |
| Electroconductivity (S/cm) | 35 | 45 | 40 | 35 |
| Internal expansion stress (%) | 0 | 50 | 100 | 150 |

As shown in Table 5 above, although the electroconductivity remains constant, the internal stress resistance of the fiber increased.

As described above, according to example embodiments, an electroconductive fiber having increased internal stress resistance may be manufactured. Also, a method of manufacturing the fiber, a fiber complex including the fiber and use of the fiber have been described.

It should be understood that the example embodiments described therein should be considered in a descriptive sense only and not for purposes of limitation. Descriptions of features or aspects within each example embodiment should typically be considered as available for other similar features or aspects in other example embodiments.

What is claimed is:

1. A fiber, comprising:

an electroconductive polymer;

an elastic polymer that forms a fiber structure with the electroconductive polymer; and a carboneous material on at least one of the electroconductive polymer and the elastic polymer.

2. The fiber of claim 1, wherein the carboneous material is on the at least one of the electroconductive polymer and the elastic polymer through a noncovalent bond.

3. The fiber of claim 1, wherein the carboneous material is at least one carbon nanotube.

4. The fiber of claim 3, wherein the at least one carbon nanotube is a plurality of carbon nanotubes, and the plurality of carbon nanotubes are connected to each other through a noncovalent or covalent bond.

5. The fiber of claim 4, wherein the plurality of carbon nanotubes are connected to each other through a hydrogen bond.

6. The fiber of claim 4, wherein the plurality of carbon nanotubes are connected through a chemical cross-linking bond.

7. The fiber of claim 1, wherein the fiber is an island-in-the-sea fiber including a sea part and an island part, and the sea part includes the electroconductive polymer and the elastic polymer, and the island part includes the carboneous material.

8. The fiber of claim 1, wherein the fiber has a double layered structure having a core formed of the carboneous material and a shell formed of the electroconductive polymer and the elastic polymer.

9. The fiber of claim 1, further comprising a plurality of metal nanoparticles.

10. The fiber of claim 9, wherein the plurality of metal nanoparticles are connected to the carboneous material through a dihydrogen bond.

11. The fiber of claim 9, wherein the plurality of metal nanoparticles are on a surface of the fiber or in the fiber.

12. The fiber of claim 9, wherein the plurality of metal nanoparticles are in a complex including the electroconductive polymer and the elastic polymer.

13. The fiber of claim 9, wherein the fiber is an island-in-the-sea fiber including a sea part and an island part, and the sea part includes the electroconductive polymer and the elastic polymer, and the island part includes the carboneous material and the plurality of metal nanoparticles.

14. The fiber of claim 9, wherein the fiber has a double-layered structure having a core formed of the carboneous material and the plurality of metal nanoparticles, and a shell formed of the electroconductive polymer and the elastic polymer.

15. The fiber of claim 1, wherein the carboneous material is at least one carbon nanotube selected from the group consisting of a surface-modified carbon nanotube and a non-surface-modified carbon nanotube.

16. The fiber of claim 15, wherein the surface-modified carbon nanotube is selected from the group consisting of a carbon nanotube surface-modified with 3,4-dihydroxy-L-phenylalanine (DOPA) (CNT-DOPA), a carbon nanotube surface-modified with acryl (CNT-Acryl) and a carbon nanotube surface-modified with epoxy (CNT-Epoxy).

17. The fiber of claim 1, wherein the carboneous material is at least one selected from the group consisting of carbon nanotubes, graphene, pentacene, tetracene, antracene, rubrene, parylene, coronene and mixtures thereof.

18. A fiber complex, comprising the fiber according to claim 1.

19. A method of manufacturing a fiber, comprising:

preparing a composition including an electroconductive polymer, an elastic polymer, a carboneous material and an ionic liquid; and spinning the composition so as to manufacture the fiber.

20. The method of claim 19, wherein the carboneous material is at least one carbon nanotube selected from the group consisting of a surface-modified carbon nanotube and a non-surface-modified carbon nanotube.

21. The method of claim 20, wherein the surface-modified carbon nanotube is selected from the group consisting of a carbon nanotube with surface-modified CNT-DOPA, a carbon nanotube surface-modified with CNT-Acryl and a carbon nanotube surface-modified with CNT-Epoxy.

22. The method of claim 19, wherein the composition includes at least one metal nanoparticle.

* * * * *